United States Patent
Arnold

(10) Patent No.: US 8,245,993 B2
(45) Date of Patent: Aug. 21, 2012

(54) RECESSED MOUNT WITH STOWED CLAMPS

(75) Inventor: Kathleen Elaine Arnold, York, PA (US)

(73) Assignees: Bosch Security Systems, Fairport, NY (US); Robert Bosch GmbH, Stuttgart (DE)

( * ) Notice: Subject to any disclaimer, the term of this patent is extended or adjusted under 35 U.S.C. 154(b) by 294 days.

(21) Appl. No.: 12/719,270

(22) Filed: Mar. 8, 2010

(65) Prior Publication Data
US 2011/0154773 A1  Jun. 30, 2011

Related U.S. Application Data

(60) Provisional application No. 61/291,034, filed on Dec. 30, 2009.

(51) Int. Cl.
B42F 13/00 (2006.01)
(52) U.S. Cl. ........................................................ 248/343
(58) Field of Classification Search .................. 248/343, 248/342, 344; 396/419, 427, 428; 348/373, 348/144, 151
See application file for complete search history.

(56) References Cited

U.S. PATENT DOCUMENTS

| | | | |
|---|---|---|---|
| 5,206,464 A | 4/1993 | Lamm et al. | |
| 5,931,432 A | 8/1999 | Herold et al. | |
| 6,234,691 B1 | 5/2001 | Jones et al. | |
| 6,320,608 B1 | 11/2001 | Yap et al. | |
| 6,752,520 B2 | 6/2004 | Vernusset et al. | |
| 6,850,025 B1* | 2/2005 | Paolantonio et al. | 318/685 |
| 6,896,423 B2 | 5/2005 | Arbuckle et al. | |
| 6,913,403 B2 | 7/2005 | Paolantonio et al. | |
| 6,992,723 B1 | 1/2006 | Wulf et al. | |
| 7,401,681 B2 | 7/2008 | Iwayama et al. | |
| 2005/0094994 A1* | 5/2005 | Paolantonio et al. | 396/427 |
| 2007/0127911 A1 | 6/2007 | Frick et al. | |
| 2010/0155556 A1* | 6/2010 | Nelson et al. | 248/231.9 |

FOREIGN PATENT DOCUMENTS

| | | |
|---|---|---|
| EP | 0923176 A1 | 6/1999 |
| EP | 1564859 A1 | 8/2005 |
| FR | 2839820 A1 | 11/2003 |
| GB | 2260655 A | 4/1993 |
| GB | 2426638 A | 11/2006 |

* cited by examiner

*Primary Examiner* — Ramon Ramirez
(74) *Attorney, Agent, or Firm* — Taft Stettinius & Hollister LLP; Keith J. Swedo

(57) ABSTRACT

A method of attaching a mounting bracket to a substrate having a throughhole includes providing the bracket with two clamp halves. One of the clamp halves is translated in a radially inward direction relative to a body of the bracket to thereby place the one clamp half in a stowed position. The bracket is partially inserted through the throughhole such that the one clamp half in the stowed position passes through the throughhole and the other clamp half does not pass through the throughhole. After the partially inserting step, the one clamp half is translated in a radially outward direction relative to the body of the bracket to thereby place the one clamp half in an operable position. A threaded member that is threadedly engaged to the one clamp half is rotated to thereby move the one clamp half toward the other clamp half until the substrate is clamped between the two clamp halves.

20 Claims, 20 Drawing Sheets

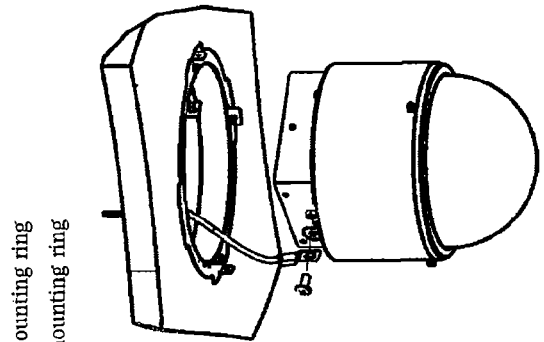
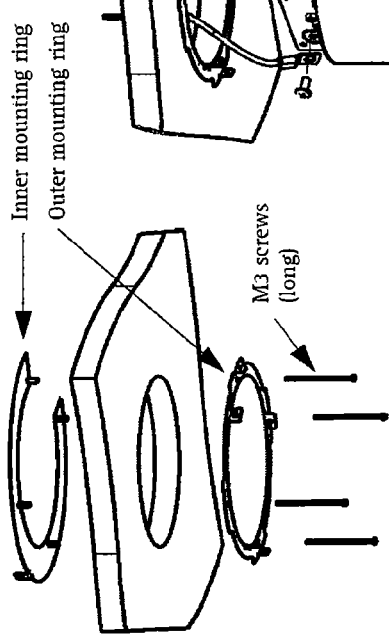
FIG. 5b PRIOR ART
FIG. 5a PRIOR ART

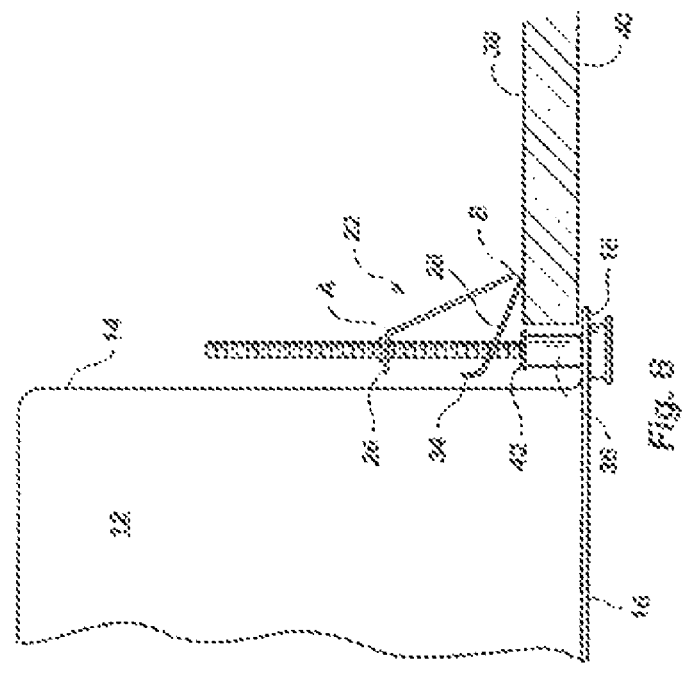
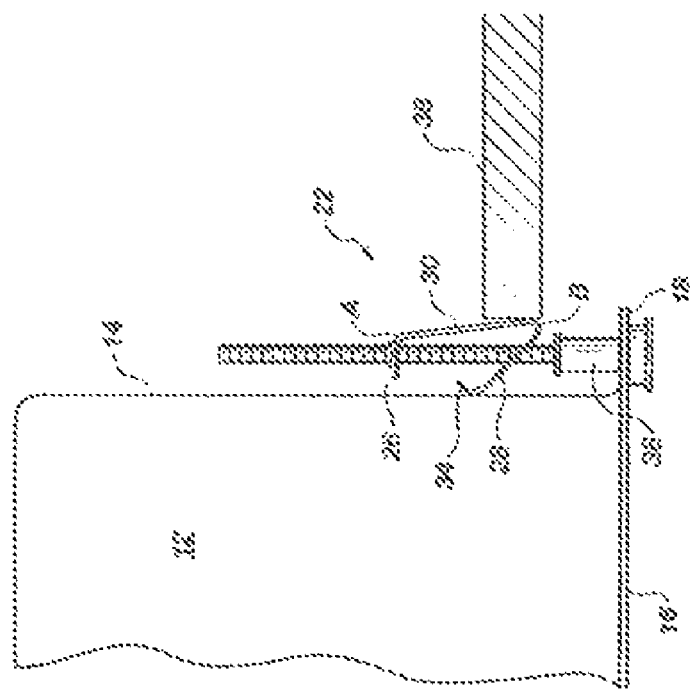

RECESSED MOUNT WITH STOWED CLAMPS

RELATED APPLICATION

This application is a nonprovisional of, and claims the benefit of, provisional application 61/291,034, filed Dec. 30, 2009, entitled "Recessed Mount with Stowed Clamps", by applicant Kathleen Elaine Arnold, which is hereby incorporated by reference herein in its entirety.

BACKGROUND OF THE INVENTION

1. Field of the Invention

The present invention relates to a mounting system for a surveillance camera, and, more particularly, to a mounting system for an in-ceiling surveillance camera that must be installed with access only from below the ceiling.

2. Description of the Related Art

Ease of installation is a very important aspect of any kind of equipment mounts, especially when a device such as an in-ceiling surveillance camera must be installed with only access from below the ceiling. Once a hole has been cut into the ceiling panel, the installer wants to wire up the camera, insert it into the opening, and fasten it from below with confidence that it will have engaged the ceiling panel securely.

Some prior art recessed mounts require the user to use and/or provide additional loose hardware to secure the mount to the ceiling panel. This loose hardware is inconvenient to handle and can fall and be lost. Other prior art recessed mounts require the installer to use tools to tighten fasteners inside the ceiling opening during mount insertion, which can be difficult due to restricted access. Some prior art recessed mounts feature complex clamp mechanisms which may or may not ensure full engagement when installed with no access above the ceiling panel. Finally, some prior art uses clamps that expand into position but must be deflected by the edge of the ceiling opening during installation, which requires more insertion force and can damage or disturb the ceiling panel.

Various camera mounts of the prior art are illustrated in FIGS. 1-13. The above-ceiling ring shown in FIG. 1, and disclosed in U.S. Pat. No. 6,896,423, has the disadvantages of requiring access above the ceiling panel to position the ring, and the need for loose hardware. An above-ceiling fastener is illustrated in FIG. 2. Depending on how skilled the installer is, the above-ceiling fastener might not require access above the ceiling panel, but the fastener still features loose hardware.

The hard ceiling can shown in FIG. 3 appears to rely on wing tabs secured by bolts from the inside of the can. It may be possible that the wing tabs can be translated vertically to accommodate different ceiling panel thicknesses. However, a disadvantage is that the wing tabs cannot be attached until the can has been inserted through the ceiling opening. Another disadvantage is that the fasteners must be accessed either from above the ceiling, or through the bottom of the can.

The drop ceiling mount of FIGS. 4 and 5a-b is comprised of two rings, one that rests on the top of the ceiling panel around the perimeter of the ceiling opening, and one that supports the camera housing via three radial bolts. A discontinuity or gap in the top ring allows the top ring to be inserted from below the ceiling, and the bolts engaging the lower ring are accessible from below, so no top access is required. However, the system contains loose hardware which is very inconvenient for the installer.

The spring clamp approach shown in FIGS. 6-7 works from below, and, once assembled, eliminates the need for loose hardware. However, the spring clamps must be deflected inward when passing through the ceiling opening, exerting force on the edge of the opening and therefore on the entire ceiling panel. For some materials such as an acoustic tile or even sheet rock, this could result in damage and/or displacement of the ceiling panel.

The recessed mounted housing of FIGS. 8 and 9a-b is disclosed in U.S. Pat. No. 5,931,432. In addition to the disadvantage of damage/displacement of the tile due to insertion force, this design also relies on the clamp material having several critical properties: radial flexibility to allow insertion through the ceiling hole, elastic memory to spring back once inserted, and high strength to resist stripping of the bolt threads and collapse of the clamp as the bolt is tightened.

An apparatus for mounting a surveillance camera is shown in FIG. 10 and disclosed in U.S. Pat. No. 6,234,691. This in-ceiling backbox design includes a flex clamp that is similar to the one shown in FIGS. 8 and 9a-b.

A fixed support for a recessed mounting luminaire is shown in FIG. 11 and disclosed in U.S. Pat. No. 6,752,520. This luminaire clamp arrangement works from below the ceiling panel with no entry forces. However, the mechanism adds complexity and cost, and being spring-actuated, it does not exert as much clamping force as can be achieved by a bolt.

Another arrangement for mounting a surveillance camera is shown in FIG. 12 and disclosed in U.S. Pat. No. 6,913,403. This approach avoids loose hardware and exertion of significant forces on the ceiling opening during insertion, but does not ensure positive capture of the ceiling panel as the only force to rotate the clamp 12 into the outboard position is the rotation of the bolt 13. Therefore, in the case of a "blind" installation, where access above the ceiling panel is prohibited, there is no verification that the clamp rotated completely into position, and thus an unexpected loss of clamp connection is possible.

The in-ceiling surveillance housing shown in FIG. 13 and disclosed in U.S. Patent Application Publication No. 2007/0127911 includes a cam-guided clamp foot.

What is neither disclosed nor suggested in the prior art is a recessed mounting system that overcomes the above-described problems and disadvantages of the prior art recessed mounts.

SUMMARY OF THE INVENTION

The present invention provides a recessed mount with stowed clamps that overcomes the limitations of the prior art.

The invention comprises, in one form thereof, a method of attaching a mounting bracket to a substrate having a throughhole, including providing the bracket with two clamp halves. One of the clamp halves is translated in a radially inward direction relative to a body of the bracket to thereby place the one clamp half in a stowed position. The bracket is partially inserted through the throughhole such that the one clamp half in the stowed position passes through the throughhole and the other clamp half does not pass through the throughhole. After the partially inserting step, the one clamp half is translated in a radially outward direction relative to the body of the bracket to thereby place the one clamp half in an operable position. A threaded member that is threadedly engaged to the one clamp half is rotated to thereby move the one clamp half toward the other clamp half until the substrate is clamped between the two clamp halves.

The invention comprises, in another form thereof, a mount assembly for attaching a surveillance camera to a ceiling panel. The assembly includes a bracket having a body interconnecting two substantially plate-shaped legs. Each of the legs includes a respective through hole. Each of two first clamp halves extends in an outward perpendicular direction from a bottom portion of a respective one of the legs. Each of the first clamp halves includes a respective through hole with a substantially vertically-oriented axis. Each of two second clamp halves includes a respective threaded through hole and is disposed generally above a respective one of the first clamp halves. Each of two threaded bolts extends through the through hole of a respective first clamp half and is threadedly engaged with the threaded through hole of a respective second clamp half. Each of the bolts is movable between an operable position and a stowed position. Each of the bolts partially extends through the through hole of a respective leg in the stowed position. Each of the bolts is rotated while in the operable position to thereby translate the respective second clamp half in a vertical direction and clamp the ceiling panel between the respective first and second clamp halves.

The invention comprises, in yet another form thereof, a mount assembly for attaching a surveillance camera to a ceiling panel. The mount assembly includes a bracket having a body interconnecting two substantially plate-shaped legs. Each of the legs includes a respective first through hole and a respective second through hole. Each of two first clamp halves extends in an outward perpendicular direction from a bottom portion of a respective one of the legs. Each of the first clamp halves includes a respective through hole with a substantially vertically-oriented axis. Each of two second clamp halves includes a body portion having a respective threaded through hole and a substantially horizontally inwardly extending protrusion attached to the body portion. Each of the second clamp halves is disposed generally above a respective one of the first clamp halves. Each of two threaded bolts extends through the through hole of a respective first clamp half and is threadedly engaged with the threaded through hole of a respective second clamp half. Each of the bolts is movable between an operable position and a stowed position. Each of the body portions of the second clamp halves at least partially extends through the first through hole of a respective leg in the stowed position. Each of the protrusions at least partially extends through the second through hole of a respective leg in the stowed position. Each of the bolts is rotated while in the stowed position to thereby translate the respective second clamp half and lock the bolt in the stowed position with the protrusion latching onto a lower edge of the second through hole. Each of the bolts is rotated while in the operable position to thereby translate the respective second clamp half in a vertical direction and clamp the ceiling panel between the respective first and second clamp halves. An adjustable platform is attached to each of the legs at an adjustable vertical position. The platform is attached to and supports the surveillance camera.

An advantage of the present invention is that all hardware is captive to the mount assembly. Thus, parts cannot be easily dropped and possibly lost.

Another advantage is that tools do not need to be inserted into the ceiling opening to install the mount. Thus, the mount is easier to install.

Yet another advantage is that full engagement of the clamps is ensured, and can be visually and/or tactilely verified.

Still another advantage is that the invention provides a very simple yet effective mechanism as compared to other designs.

Further advantages are that there may be little or no contact between the mount assembly and the ceiling panel during insertion, and the stowed clamps do not exert any force on the ceiling panel until after insertion.

A still further advantage is that more interior space is provided for subsequent camera installation than by prior art mounts.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 5a is an exploded view of the prior art drop ceiling mount of FIG. 4 as it is installed into a ceiling.

FIG. 5b is a perspective view of the prior art drop ceiling mount of FIGS. 4 and 5a as installed in a ceiling and ready to receive a surveillance camera.

FIG. 9a is a side, fragmentary view of the recessed-mounted housing of FIG. 8 during insertion in a ceiling.

FIG. 9b is a side, fragmentary view of the recessed-mounted housing of FIG. 8 after insertion in a ceiling.

Figure 1:
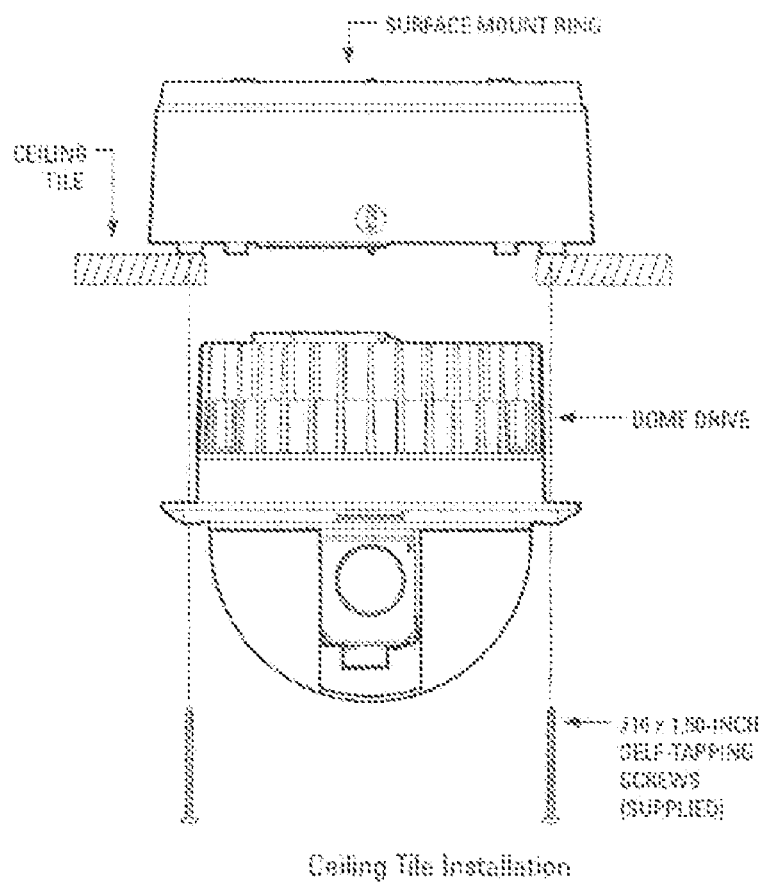
FIG. 1 is a side view of an above-ceiling ring of the prior art.
Figure 2:
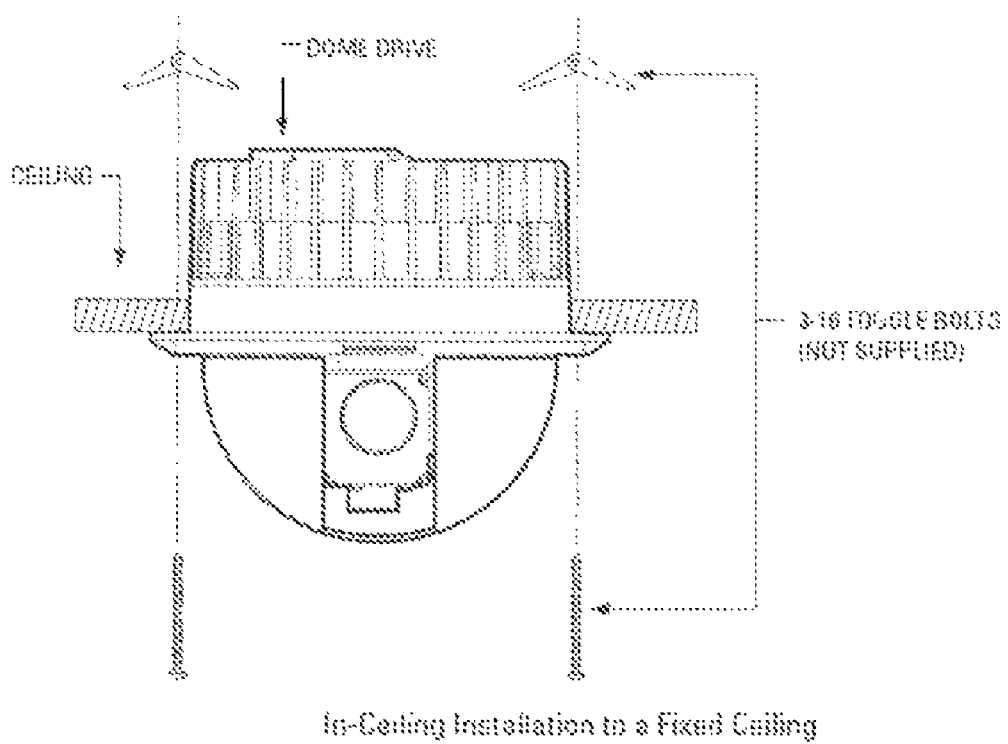
FIG. 2 is a side view of an above-ceiling fastener of the prior art.
Figure 3:
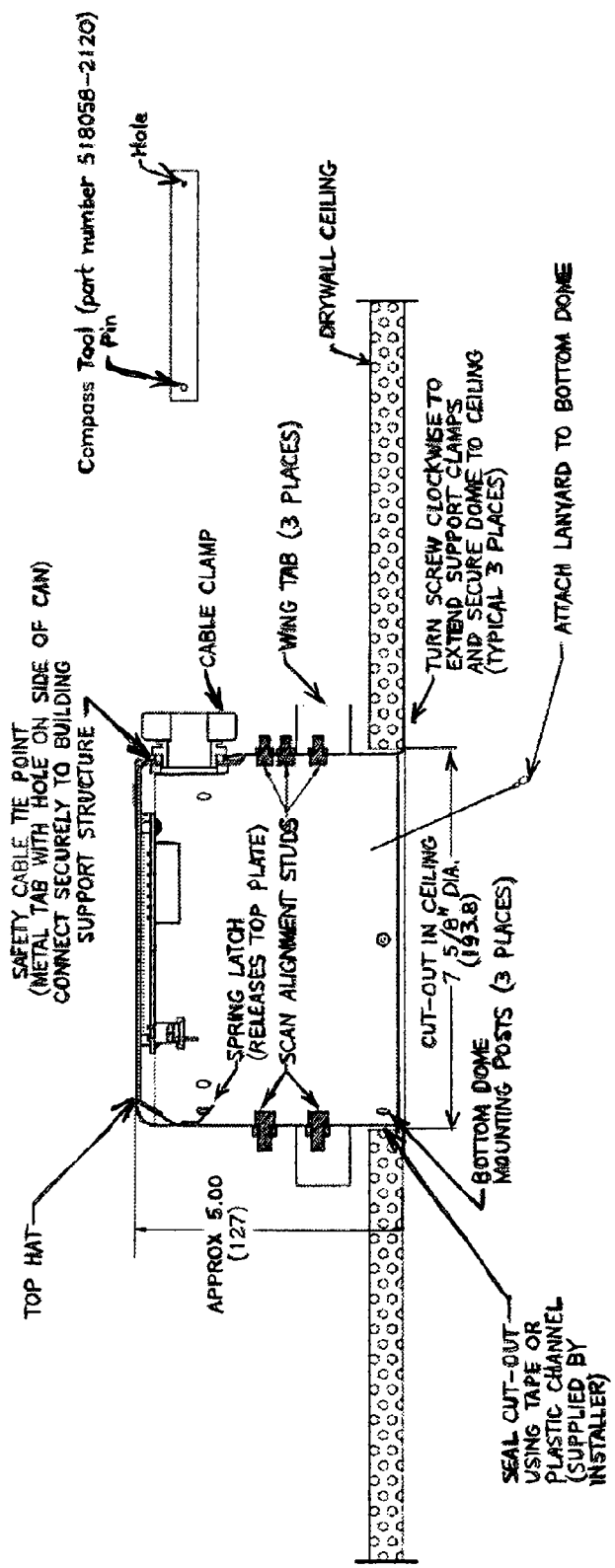
FIG. 3 is a cross-sectional view of a hard ceiling can of the prior art.
Figure 4:
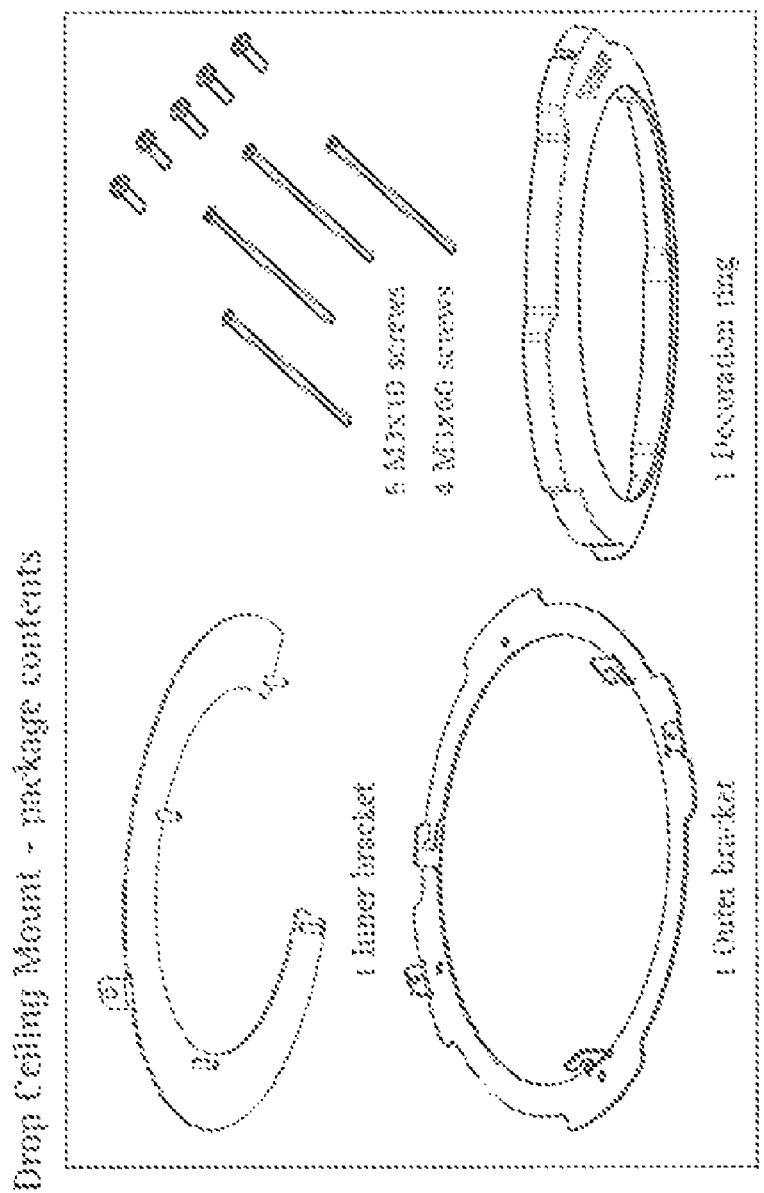
FIG. 4 is an exploded view of a drop ceiling mount of the prior art.
Figure 6:
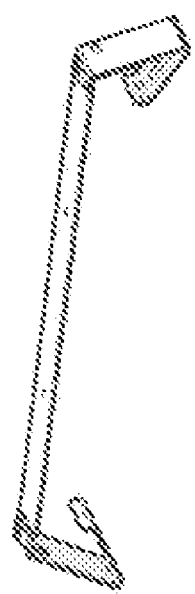
FIG. 6 is a perspective view of a spring clamp of the prior art.
Figure 7:
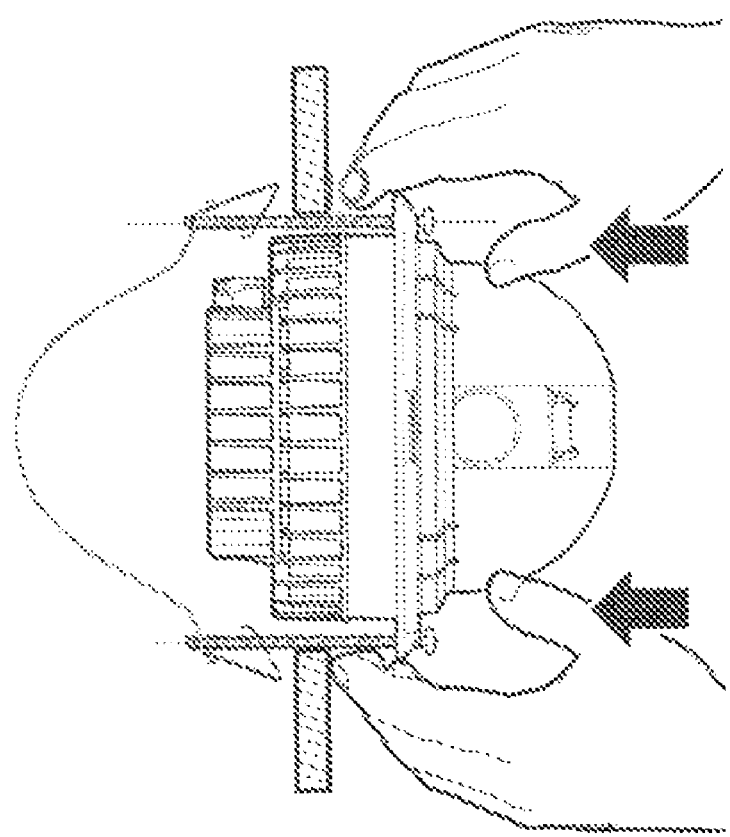
FIG. 7 is a cross-sectional view of the spring clamp of FIG. 6 as used to install a surveillance camera in a ceiling.
Figure 8:
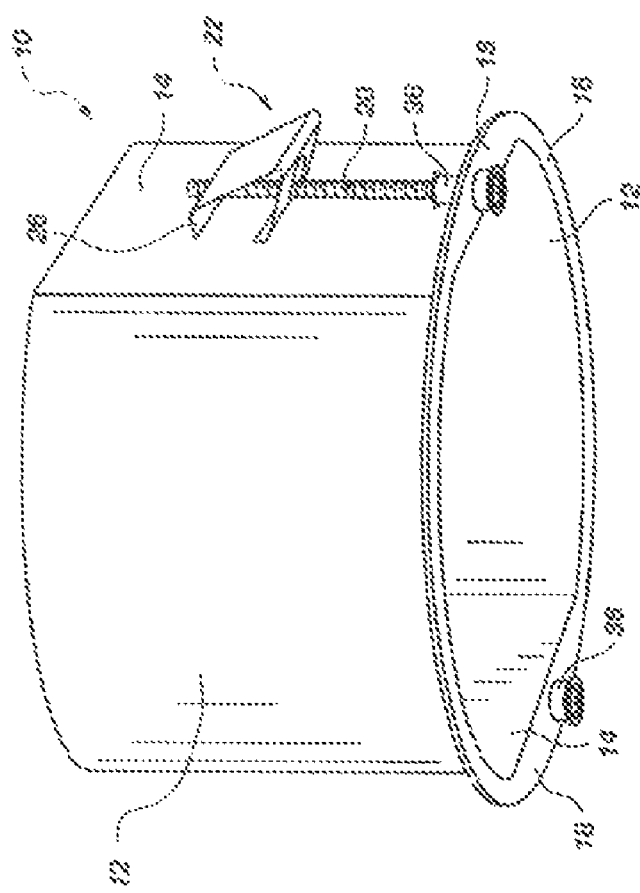
FIG. 8 is a perspective view of a recessed-mounted housing of the prior art.
Figure 10:
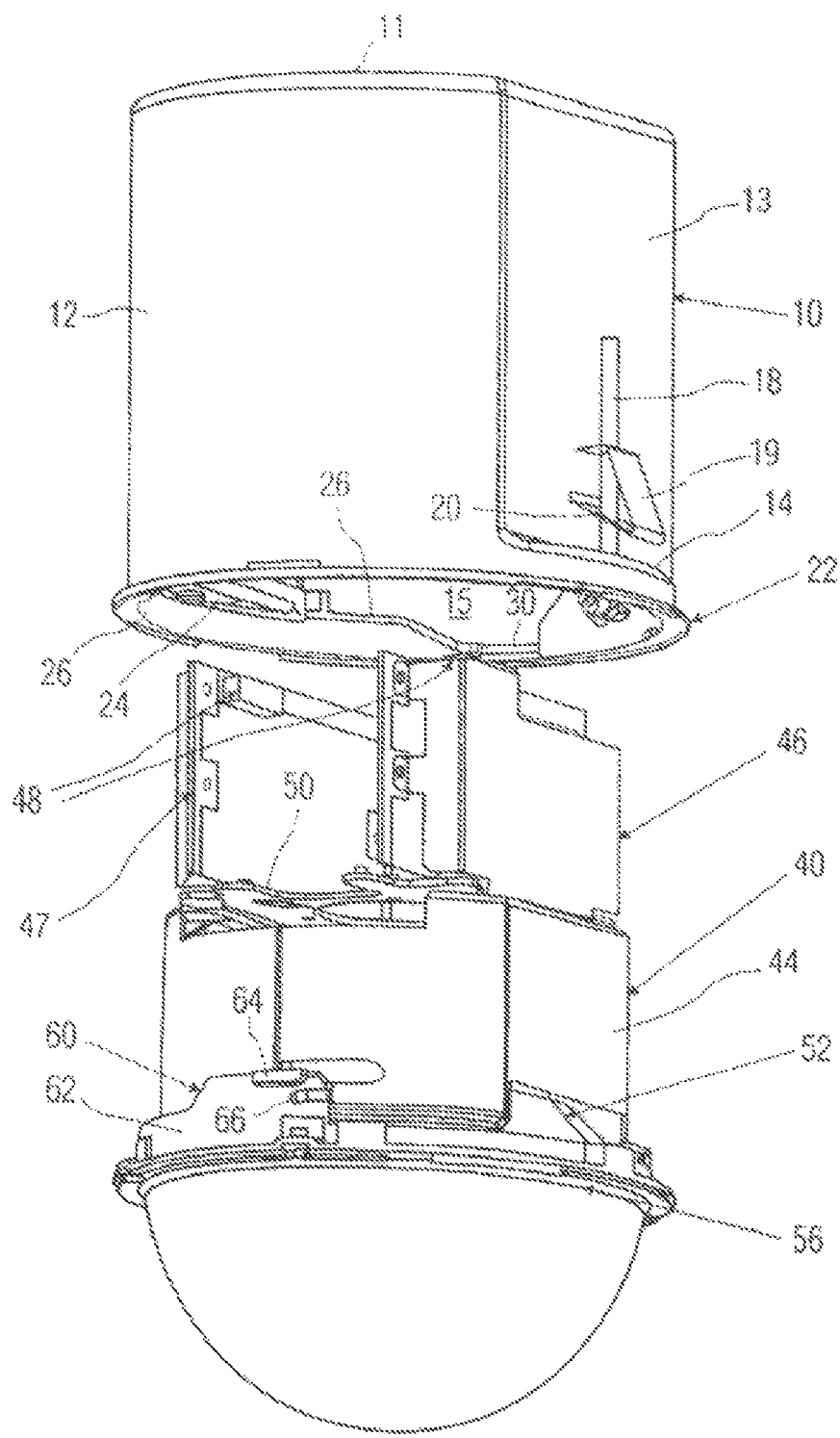
FIG. 10 is a perspective view of another apparatus of the prior art for mounting a surveillance camera.
Figure 11:
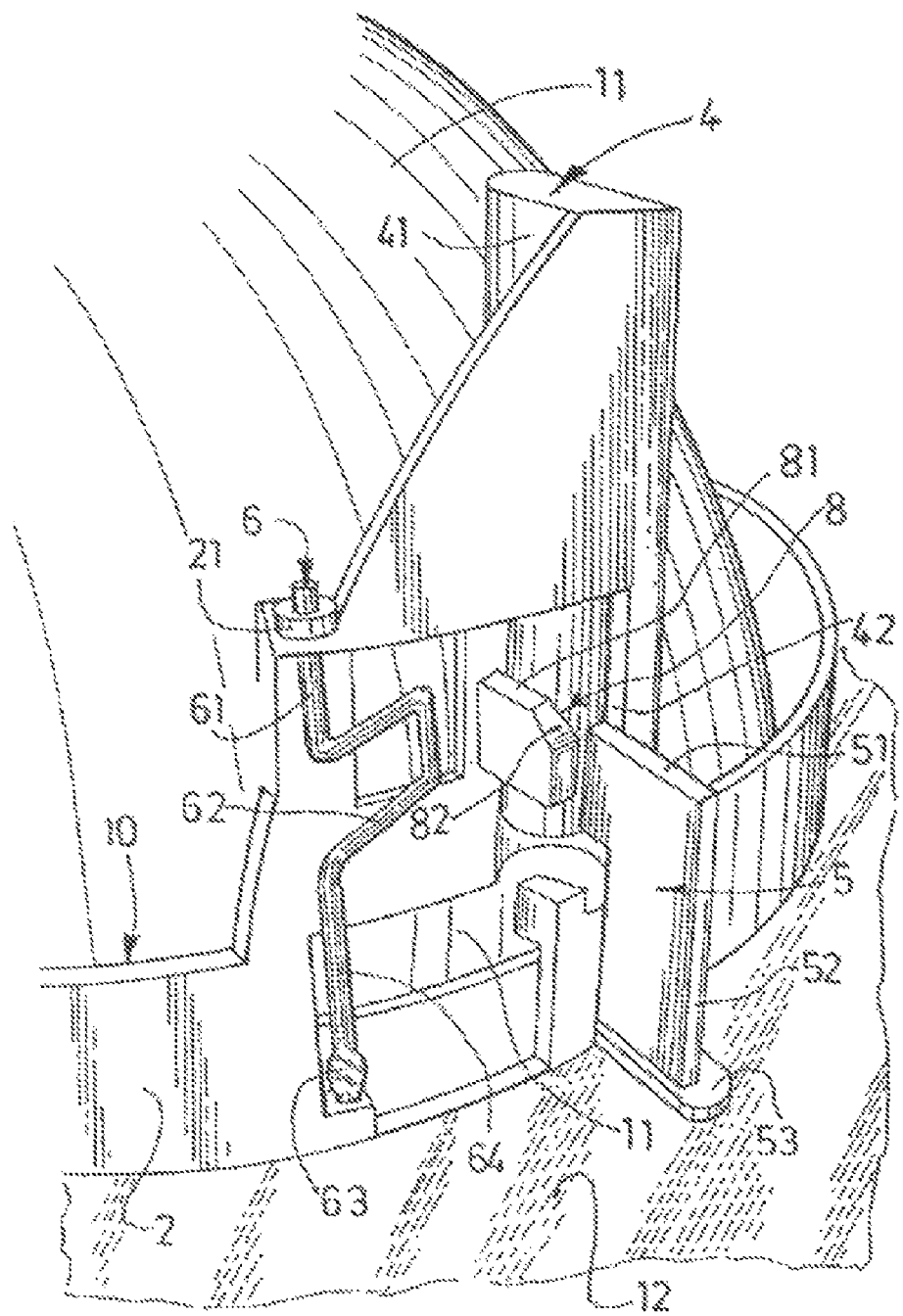
FIG. 11 is a fragmentary, perspective view of a fixed support for a recessed mounting luminaire of the prior art.
Figure 12:
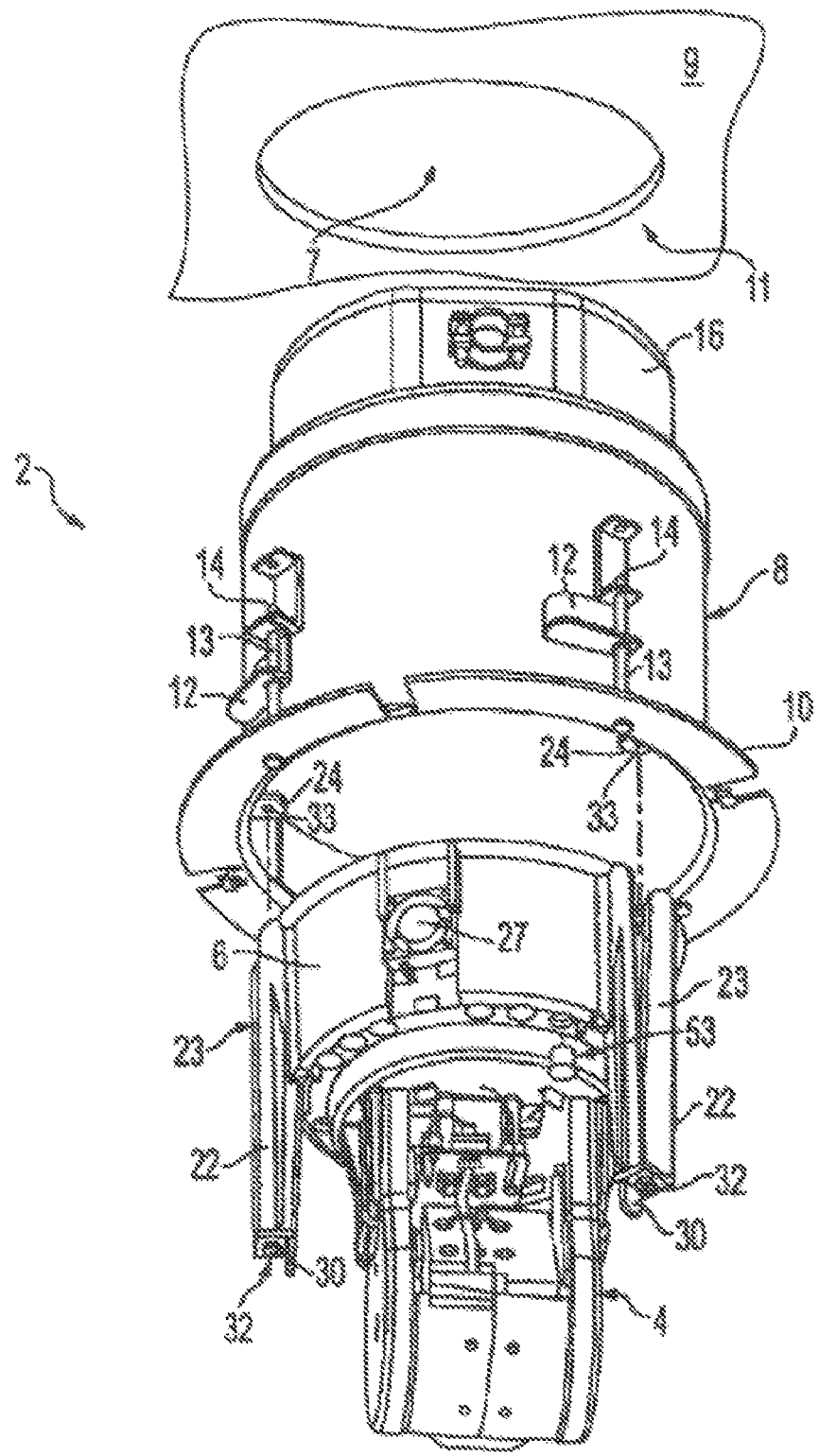
FIG. 12 is a perspective view of another prior art surveillance camera mounting apparatus.
Figure 13:
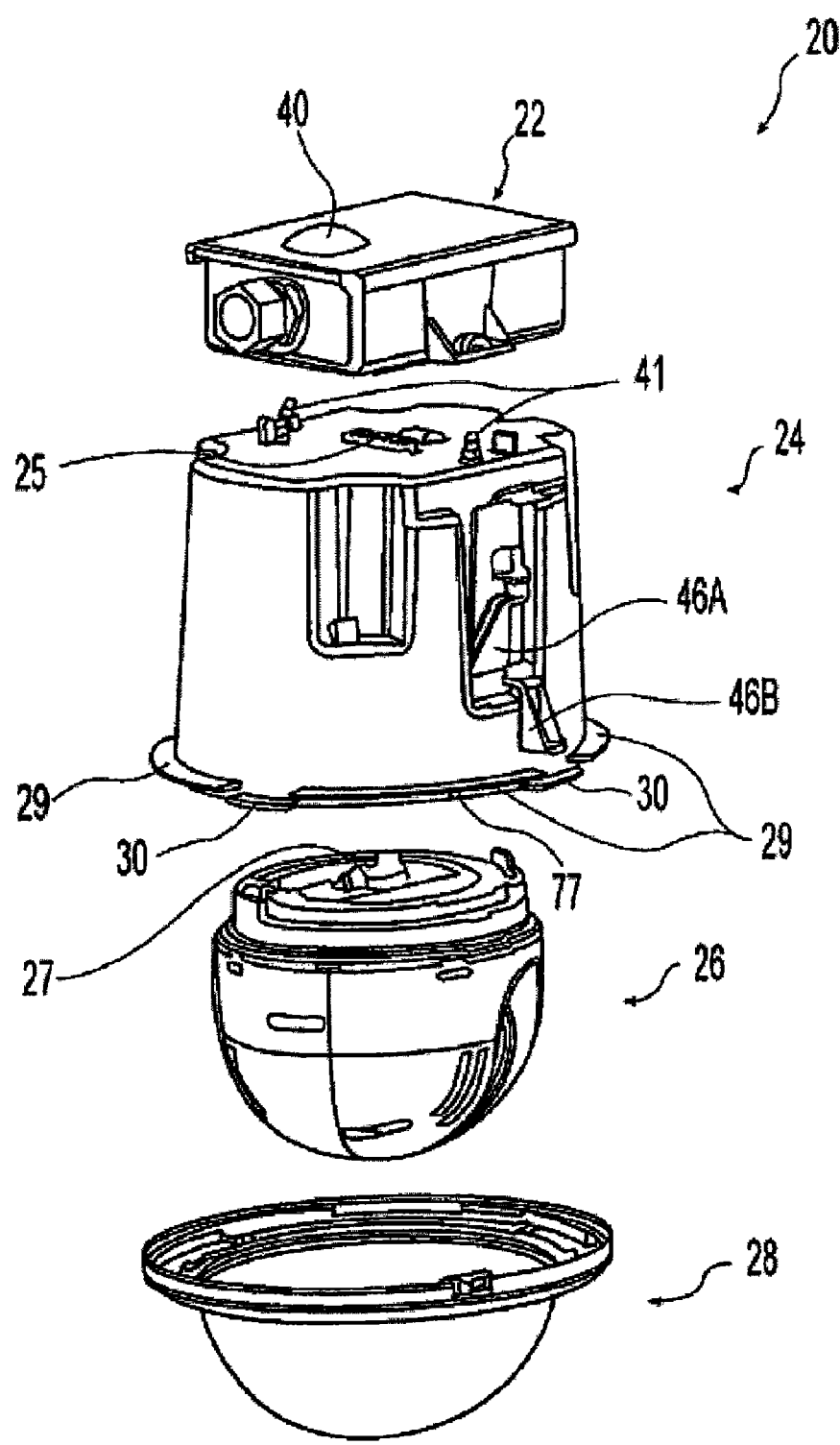
FIG. 13 is an exploded view of yet another prior art in-ceiling surveillance camera housing.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

Figure 14:
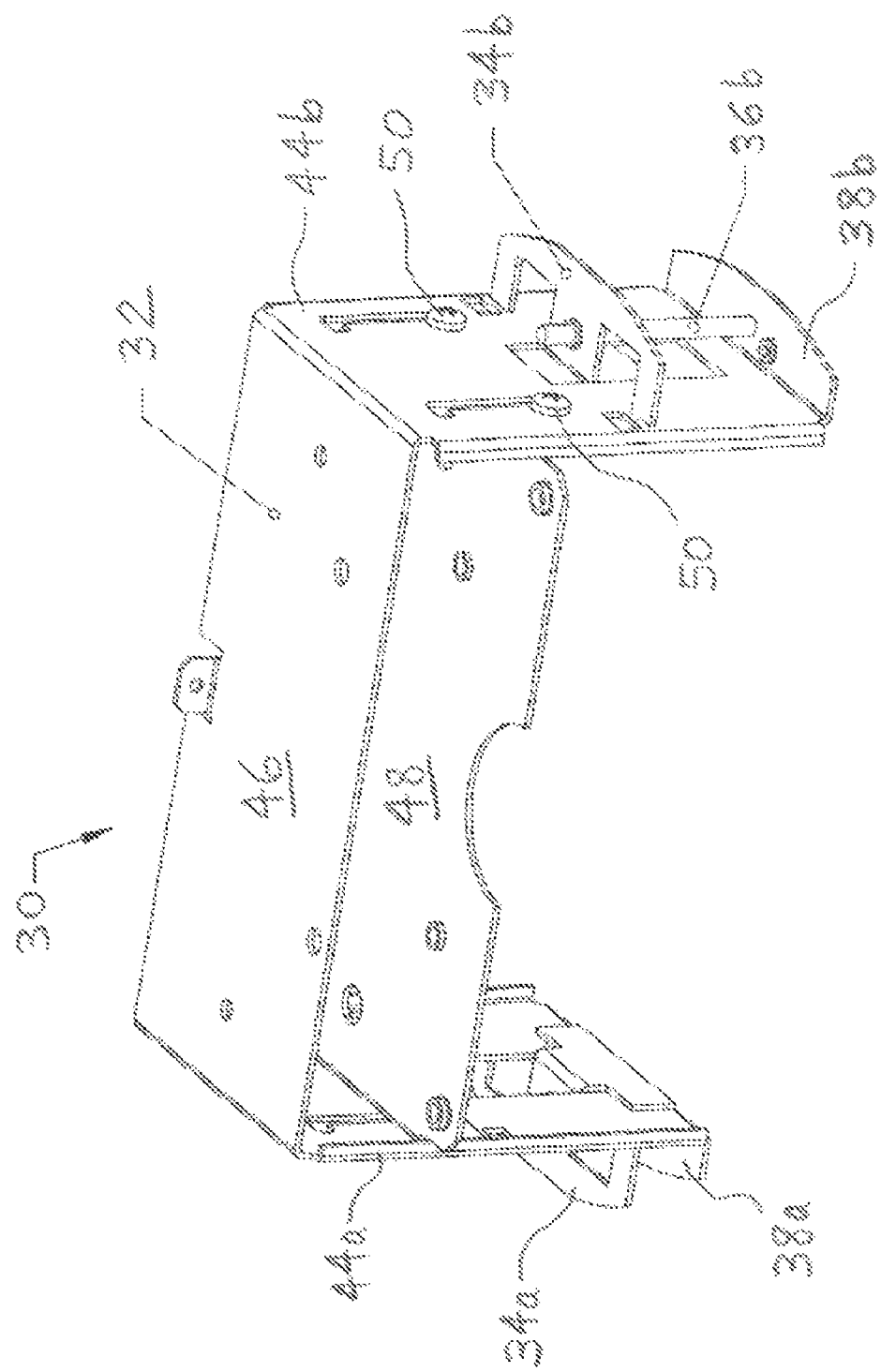
FIG. 14 is a perspective view of one embodiment of a mount assembly of the present invention.
Figure 17:
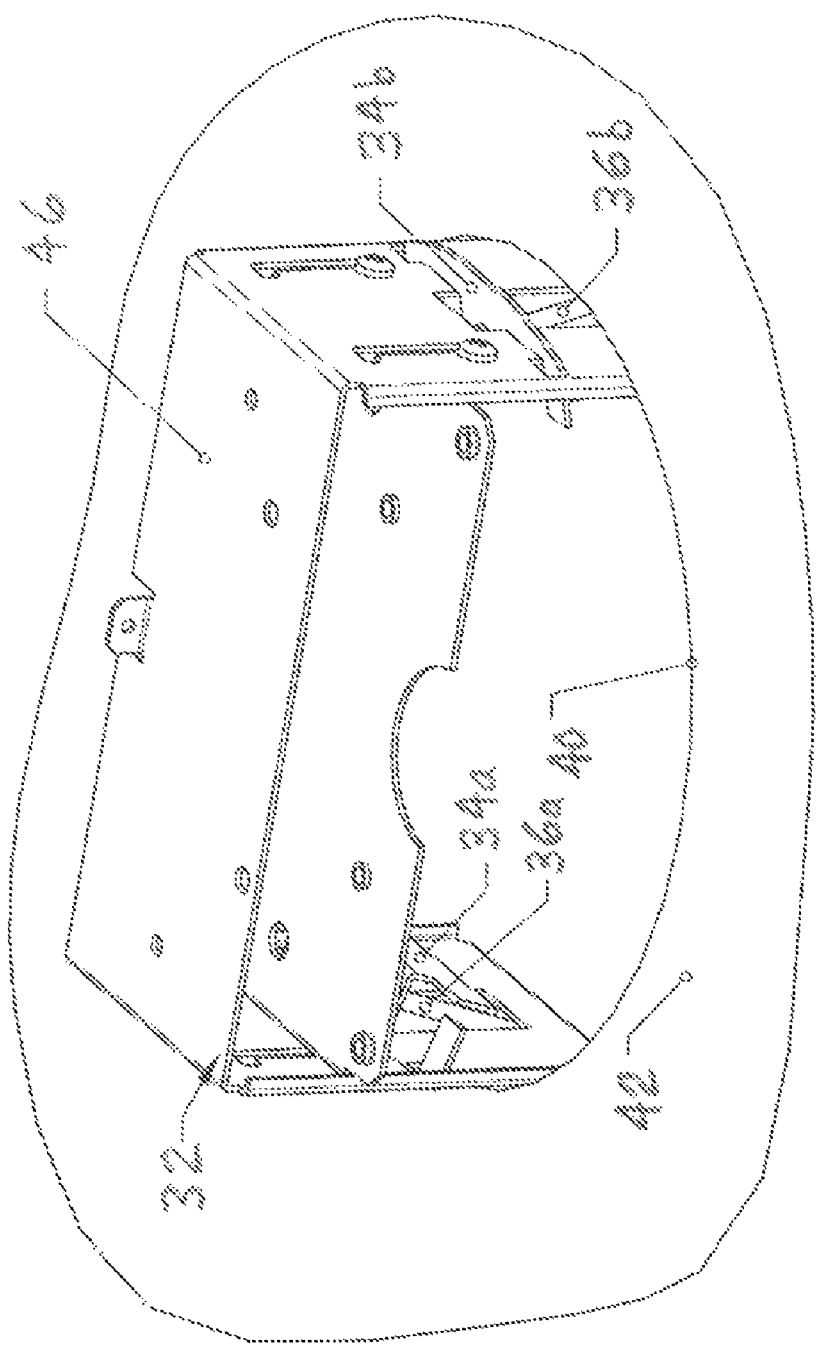
FIG. 17 is a perspective view of the mount assembly of FIG. 14 inserted into a ceiling opening and with the clamps in a stowed position.

Referring now to the drawings and particularly to FIG. 14, there is shown one embodiment of a mount assembly 30 of the present invention including a bracket 32, top clamp halves 34a-b, and bolts 36a-b (FIG. 17). Mount assembly 30 may be sized such that all but bottom clamp halves 38a-b of bracket 32 fit through an opening 40 cut through a ceiling panel 42, as shown in FIG. 17. Conversely, opening 40 may be cut to size in order to accommodate all of mount assembly 30 except for bottom clamp halves 38a-b. Bottom clamp halves 38a-b may extend in an outward perpendicular direction from a bottom portion of a respective one of legs 44a-b. FIG. 14 shows one top clamp half 34a in a fully tightened position, and the other top clamp half 34b in a loose position, where neither clamp is in the "stowed" position required for insertion into the ceiling panel.

Figure 18:
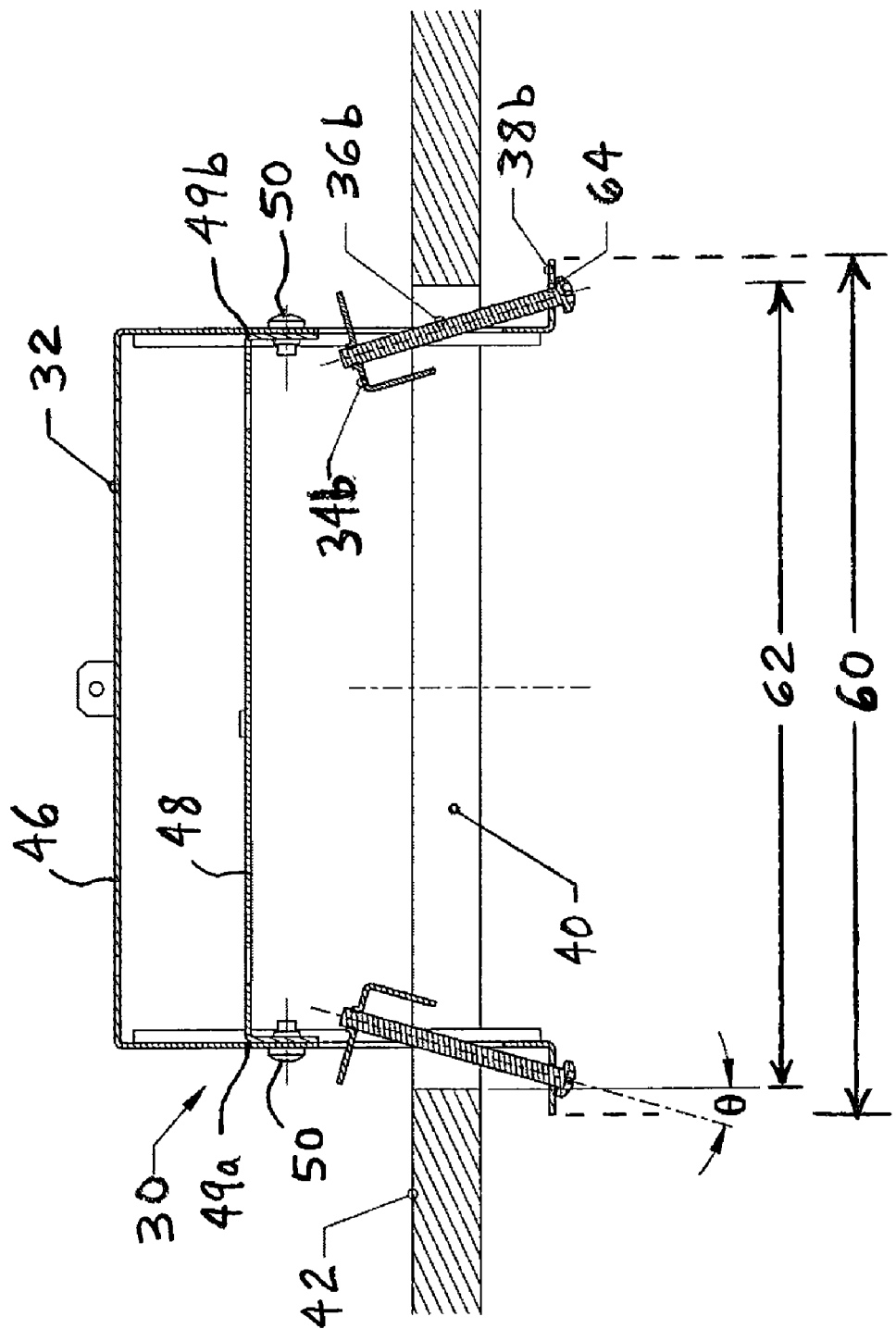
FIG. 18 is a front cross-sectional view of the mount assembly of FIG. 14 inserted into a ceiling opening and with the clamps in a stowed position.

Bracket 32 has two plate-shaped legs 44a-b interconnected by, and oriented perpendicular to, a plate-shaped body 46. Bottom clamp halves 38a-b extend perpendicularly from the respective bottom edges of legs 44a-b. A plate-shaped adjustable platform 48 has opposite ends 49a-b (FIG. 18) each connected to a respective one of legs 44a-b by two of a set of four fastening devices in the form of screws 50. Each of body 46 and platform 48 may be parallel to ceiling panel 42 after installation. Platform 48 may be attached to and support the weight of a surveillance camera (not shown) that extends down through opening 40.

As used herein, "plate-shaped" or other variations of "plate" means a substantially uniform thickness that is much less than a height and width of the object. However, "plate-shaped" or other variations of "plate" do not mean that the object is necessarily flat. That is, the object may also be curved rather than flat.

Figure 15:
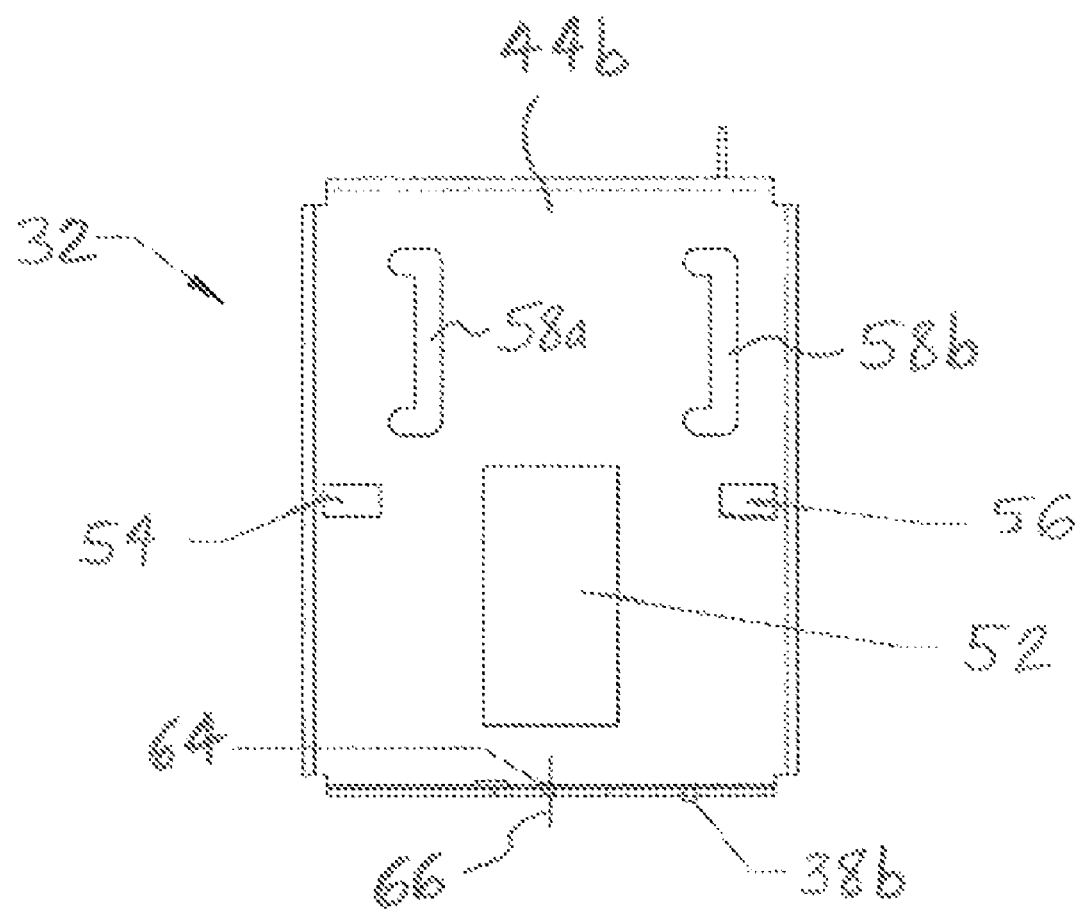
FIG. 15 is a right-hand side view of the bracket of the mount assembly of FIG. 14.
Figure 16:
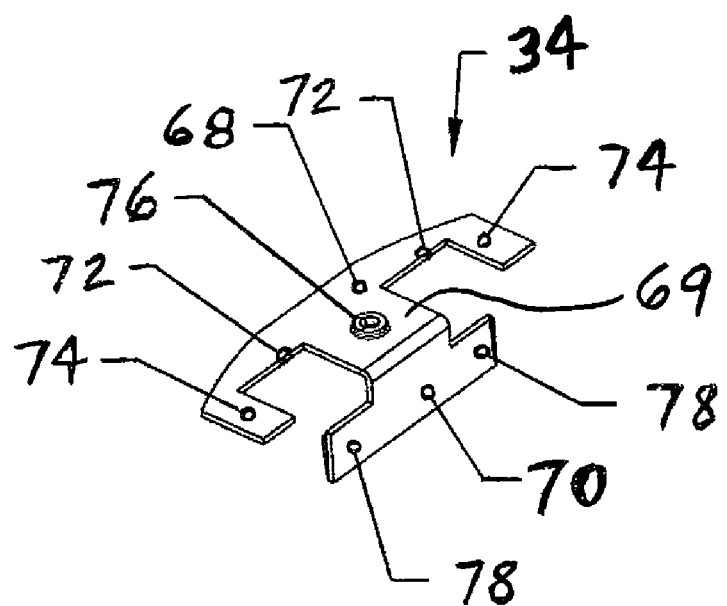
FIG. 16 is a perspective view of one of the two upper clamp halves of the mount assembly of FIG. 14.

As shown in FIG. 15, leg 44b includes a large rectangular through hole 52, smaller rectangular through holes 54, 56, through slots 58a-b, and bottom clamp half 38b. An overall width 60 (FIG. 18) of bracket 32 from the distal tip of bottom clamp half 38a to the distal tip of bottom clamp half 38b exceeds a diameter 62 of opening 40 of ceiling panel 42. Thus, when mount assembly 30 is inserted through opening 40, the top surfaces of bottom clamp halves 38a-b seat against the bottom surfaces of ceiling panel 42 adjacent to opening 40. Bottom clamp half 38b includes a through hole 64 having an imaginary axis 66 (FIG. 15) that is parallel to the axis of ceiling opening 40. Leg 44a is substantially similar to leg 44b, and thus is not described in detail herein in order to avoid needless repetition.

Each of top clamp halves 34a-b includes a top or upper E-shaped leg 68 and a lower cantilever leg 70 extending approximately perpendicularly from a middle body portion 69 of leg 68. E-shaped leg 68 includes rectangular cut-outs 72 that define body portion 69 between two protrusions 74. Body portion 69 also includes a threaded through hole 76 that receives bolt 36. Cantilever leg 70 includes protrusions 78. As shown in FIG. 14, cut-outs 72 may enable cantilever leg 70 and associated protrusions 78 to pass through large rectangular through hole 52 in leg 44 such that rotation of bolt 36 may cause top clamp half 34 to translate in a direction perpendicular to ceiling panel 42 while staying engaged with leg 44. More particularly, one of the two clamp protrusions 74 may engage leg 44 to prevent top clamp half 34 from rotating along with bolt 36, and thus top clamp half 34 translates in vertical directions along the height of leg 44.

During installation, and before insertion of mount assembly 30 into ceiling opening 40, top clamp halves 34 may be placed in a "stowed" position as shown in FIG. 17. Each of bolts 36a-b may be rotated until top clamp halves 34a-b translate up enough for clamp protrusions 74 to fit into the smaller rectangular through holes 54, 56 in each of legs 44a-b. Because the diameters of through holes 64 of bottom clamp halves 38 are slightly larger than the outer thread diameter of bolts 36, bolts 36 and top clamp halves 34 may all tilt inward at an angle $\theta$(FIG. 18) relative to a vertical direction to a "stowed" position in which bolts 36 and top clamp halves 34 may pass through ceiling opening 40 without touching or making contact with ceiling panel 42. In this stowed position, bolts 36 and body portions 69 of legs 68 may extend at least partially through large rectangular through hole 52.

This "stowed" position with angle $\theta$ at a maximum can be maintained during shipping by slightly tightening bolt 36 such that the bottom surface of E-shaped top leg 68 of top clamp half 34 is drawn up against the lower edges of smaller rectangular through holes 54, 56. Thus, rotation of bolt 36 may translate top clamp half 34 and lock bolt 36 in the stowed position with protrusions 74 latching onto the lower edges of through holes 54, 56. With this method, mount assembly 30 can be removed from its shipping packaging already in the stowed position and immediately inserted into ceiling opening 40 without any manipulation or adjustment.

Once inserted, bolts 36 may be rotated in the opposite direction to thereby translate protrusions 74 away from (i.e., unlatch protrusions 74 from) the lower edges of through holes 54, 56 and unlock bolts 36 from the stowed position. Bolts 36 and top clamp halves 34 may be then shifted outboard to engage the top surface of ceiling panel 42 with the bottom surfaces of E-shaped top legs 68 of top clamp halves 34. This pivoting of bolts 36 and top clamp halves 34 until angle $\theta$ is at a minimum may be accomplished by the user either a) applying force in the outboard directions to cantilevered legs 70 of top clamp halves 34 by reaching his hand up into ceiling panel opening 40, or b) engaging the heads of bolts 36 with a tool such as a bolt driver or screwdriver, and using the screwdriver to pivot bolts 36 and top clamp halves 34 until angle $\theta$ is at a minimum and possibly at zero. In one embodiment, the bolt heads may each have a screwdriver recess configured to support pivoting; for instance, a TORX recess with deeper more positive engagement instead of a slotted or cross-recess with less positive engagement.

Figure 19:
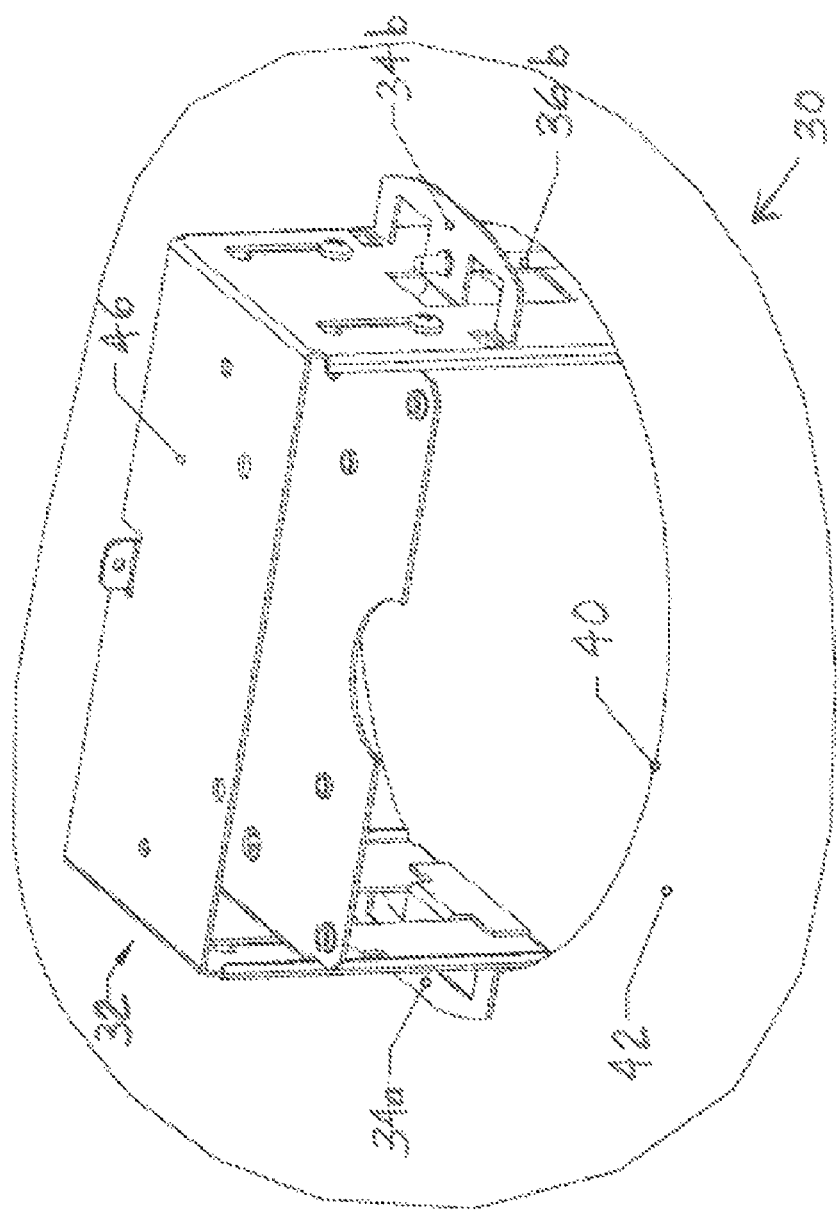
FIG. 19 is a perspective view of the mount assembly of FIG. 14 inserted into a ceiling opening and with the clamps engaged in an operable position.
Figure 20:
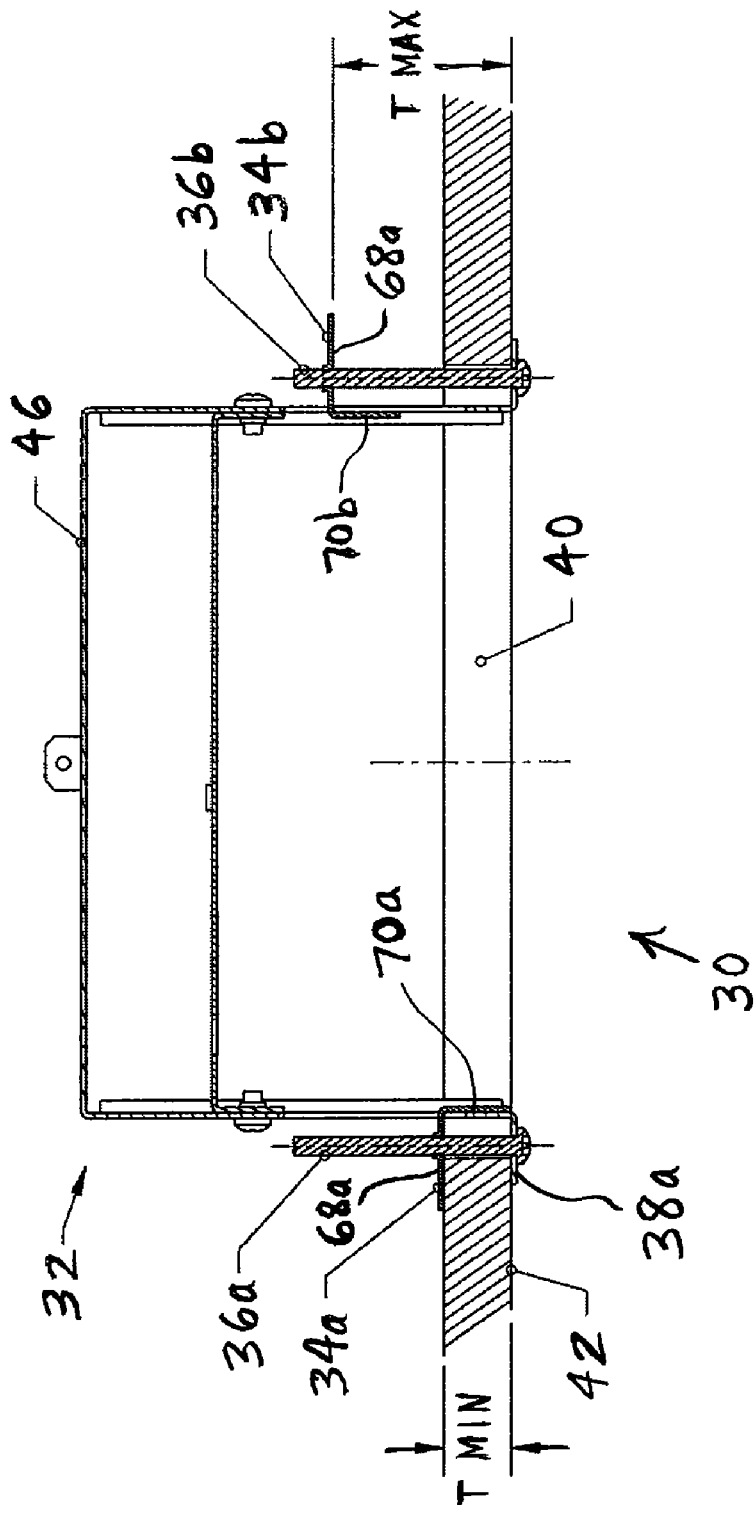
FIG. 20 is a front cross-sectional view of the mount assembly of FIG. 14 inserted into a ceiling opening and with the clamps engaged in an operable position.

FIGS. 19 and 20 illustrate mount assembly 30 engaged with ceiling panel 42. Bolt 36a has been tightened enough to bring top clamp half 34a down onto the top of ceiling panel 42 to thereby clamp ceiling panel 42 between bottom clamp half 38a and top clamp half 34a. The other bolt 36b is shown in FIGS. 19 and 20 as being not yet fully tightened, and so top clamp half 34b has not yet come into contact with the top surface of ceiling panel 42. As illustrated by the process described with reference to FIGS. 19 and 20, different ceiling panel thicknesses, ranging from T min to T max, may be accommodated by mount assembly 30.

Once both bolts 36a-b are tightened, the user can verify the security of mount assembly 30 by visually or tactilely checking the position of top clamp halves 34a-b from inside ceiling opening 40. If assembly 30 is not fully secure, the user can incrementally tighten bolts 36a-b until assembly 30 is fully secure. Thus, bolts 36a-b may be tightened more than would be possible with a spring-loaded mechanism. In one embodiment, the outer edges of any or all of top clamp halves 34a-b and bottom clamp halves 38a-b have small barbs or sharp protrusions (not shown) in order to "bite" into ceiling panel 42 for even more security after installation. As best shown in FIG. 20, each of lower legs 70 may be disposed on an inside of a respective leg 44, and each of upper legs 68 may be disposed on an outside of the respective leg 44 in the operable position.

Adjustable platform 48 may be secured to the two legs 44 using captive screws 50. Each of screws 50 may be attached to platform 48 through a corresponding one of slots 58, thereby fixing platform 48 at a chosen vertical position.

Prior to insertion, if the installer desires to install a camera with a taller housing, then screws 50 may be slightly loosened and platform 48 may be vertically lifted to the upper end of slots 58a-b such that adjustable platform 48 can accommodate the larger camera housing while maintaining the housing window (not shown) at the same desired vertical position relative to the bottom of ceiling panel 42. This enables both camera housings to present the same covert appearance regardless of camera body size.

While this invention has been described as having an exemplary design, the present invention may be further modified within the spirit and scope of this disclosure. This application is therefore intended to cover any variations, uses, or adaptations of the invention using its general principles.

What is claimed is:

1. A method of attaching a mounting bracket to a substrate having a throughhole, the method including:
   providing the bracket with two clamp halves;
   translating one of the clamp halves in a radially inward direction relative to a body of the bracket to thereby place the one clamp half in a stowed position;
   partially inserting the bracket through the throughhole such that the one clamp half in the stowed position passes through the throughhole and the other clamp half does not pass through the throughhole;
   after the partially inserting step, translating the one clamp half in a radially outward direction relative to the body of the bracket to thereby place the one clamp half in an operable position; and
   rotating a threaded member that is threadedly engaged to the one clamp half to thereby move the one clamp half toward the other clamp half until the substrate is clamped between the two clamp halves.

2. The method of claim 1 comprising the further step, before the rotating step, of visually or tactilely verifying that the one clamp half is in the operable position.

3. The method of claim 1 wherein the two clamp halves comprise first and second clamp halves, the method comprising the further steps of:
   providing the bracket with third and fourth clamp halves;
   translating the third clamp half in a radially inward direction relative to the body of the bracket to thereby place the third clamp half in a stowed position;
   partially inserting the bracket through the throughhole such that the third clamp half in the stowed position passes through the throughhole and the fourth clamp half does not pass through the throughhole;
   after the partially inserting step, translating the third clamp half in a radially outward direction relative to the body of the bracket to thereby place the third clamp half in an operable position; and
   rotating a threaded member that is threadedly engaged to the third clamp half to thereby move the third clamp half toward the fourth clamp half until the substrate is clamped between the third and fourth clamp halves.

4. The method of claim 1 wherein the body of the bracket is substantially plate-shaped, the method comprising the further step of providing a plate-shaped leg extending substantially perpendicularly from an edge of the plate-shaped body, each of the clamp halves being coupled to the leg.

5. The method of claim 4 wherein the leg includes first and second through holes, the one clamp half including first and second protrusions, wherein the step of translating the one clamp half in a radially inward direction includes inserting the first protrusion into the first through hole and inserting the second protrusion into the second through hole.

6. The method of claim 5 wherein the leg includes a third through hole that is larger than each of the first and second through holes, wherein the step of translating the one clamp half in a radially inward direction includes partially inserting the one clamp half into the third through hole.

7. The method of claim 1 wherein the body of the bracket is substantially plate-shaped, the method comprising the further steps of:
   providing a first and second plate-shaped legs extending substantially perpendicularly from respective opposite edges of the plate-shaped body;
   providing at least one vertical slot in each of the legs;
   translating an adjustable platform along the slots to a position that accommodates a height of a camera to be attached to the platform; and
   fixing the platform in place at the position that accommodates the height of the camera.

8. A mount assembly for attaching a surveillance camera to a ceiling panel, the assembly comprising:
   a bracket including a body interconnecting two substantially plate-shaped legs, each of the legs including a respective through hole;
   two first clamp halves, each of the first clamp halves extending in an outward perpendicular direction from a bottom portion of a respective one of the legs, each of the first clamp halves including a respective through hole with a substantially vertically-oriented axis;
   two second clamp halves, each of the second clamp halves including a respective threaded through hole and being disposed generally above a respective one of the first clamp halves; and
   two threaded bolts, each of the bolts extending through the through hole of a respective said first clamp half and threadedly engaged with the threaded through hole of a respective said second clamp half, each of the bolts being movable between an operable position and a stowed position, each of the bolts partially extending through the through hole of a respective said leg in the stowed position, each of the bolts being configured to be rotated while in the operable position to thereby translate the respective second clamp half in a vertical direction and clamp the ceiling panel between the respective first and second clamp halves.

9. The assembly of claim 8 wherein the legs are substantially parallel.

10. The assembly of claim 8 wherein each of the second clamp halves partially extends through the through hole of a respective said leg in the stowed position.

11. The assembly of claim 8 wherein each of the second clamp halves includes:
   a lower leg disposed on an inside of a respective said leg; and
   an upper leg disposed on an outside of said respective leg in the operable position.

12. The assembly of claim 8 further comprising a substantially plate-shaped vertically adjustable platform including two opposite ends, each opposite end being adjustably attached to a respective one of the two legs.

13. The assembly of claim 12, wherein each said leg includes at least one vertical slot, the assembly further comprising a plurality of fastening devices, each of the fastening devices being attached to the platform through a corresponding one of the slots and thereby fixing the platform at a chosen vertical position.

14. The assembly of claim 8 wherein each of the second clamp halves is configured to engage a respective said leg to thereby prevent rotation of the second clamp half while a respective said bolt is rotated.

15. A mount assembly for attaching a surveillance camera to a ceiling panel, the assembly comprising:
- a bracket including a body interconnecting two substantially plate-shaped legs, each of the legs including a respective first through hole and a respective second through hole;
- two first clamp halves, each of the first clamp halves extending in an outward perpendicular direction from a bottom portion of a respective one of the legs, each of the first clamp halves including a respective through hole with a substantially vertically-oriented axis;
- two second clamp halves, each of the second clamp halves including a body portion having a respective threaded through hole and a substantially horizontally inwardly extending protrusion attached to the body portion, each of the second clamp halves being disposed generally above a respective one of the first clamp halves;
- two threaded bolts, each of the bolts extending through the through hole of a respective said first clamp half and threadedly engaged with the threaded through hole of a respective said second clamp half, each of the bolts being movable between an operable position and a stowed position, each of the body portions of the second clamp halves at least partially extending through the first through hole of a respective said leg in the stowed position, each of the protrusions at least partially extending through the second through hole of a respective said leg in the stowed position, each of the bolts being configured to be rotated while in the stowed position to thereby translate the respective second clamp half and lock the bolt in the stowed position with the protrusion latching onto a lower edge of the second through hole, each of the bolts being configured to be rotated while in the operable position to thereby translate the respective second clamp half in a vertical direction and clamp the ceiling panel between the respective first and second clamp halves; and
- an adjustable platform attached to each of the legs at an adjustable vertical position, the platform being configured to be attached to and support the surveillance camera.

16. The assembly of claim 15 wherein each of the legs includes a plurality of through slots, the adjustable platform being attached to the legs by a set of captive screws, each of the screws extending through a corresponding one of the slots.

17. The assembly of claim 16 wherein each of the legs includes two said second through holes, each said second clamp half including two said substantially horizontally inwardly extending protrusions, each of the protrusions at least partially extending through a respective said second through hole of a corresponding said leg in the stowed position.

18. The assembly of claim 15 wherein the body is substantially perpendicular to each of the legs.

19. The assembly of claim 15 wherein each of the bolts at least partially extends through a respective said first through hole of a respective said leg in the stowed position.

20. The assembly of claim 15 wherein each of the bolts is configured to be rotated in a first rotational direction while in the operable position to thereby translate the respective second clamp half in a downward direction and clamp the ceiling panel between the respective first and second clamp halves, each of the bolts being configured to be rotated in a second rotational direction opposite to the first rotational direction while in the stowed position to thereby translate the respective second clamp half in a direction away from the lower edge of the second through hole and unlock the bolt from the stowed position.

* * * * *